United States Patent
Phillips

(10) Patent No.: US 6,810,967 B1
(45) Date of Patent: Nov. 2, 2004

(54) GRASS AND SOIL TRIMMING SYSTEM

(76) Inventor: Danny L. Phillips, 601 Vine Ave., Clearwater, FL (US) 33755

( * ) Notice: Subject to any disclaimer, the term of this patent is extended or adjusted under 35 U.S.C. 154(b) by 142 days.

(21) Appl. No.: 10/212,960

(22) Filed: Aug. 6, 2002

(51) Int. Cl.$^7$ .............................................. B26B 25/00
(52) U.S. Cl. ................................ 172/13; D8/8; 30/300
(58) Field of Search .............................. 172/22, 41, 42, 172/39, 21, 91, 96, 13, 19; D8/8; 30/300

(56) References Cited

U.S. PATENT DOCUMENTS

| | | | | |
|---|---|---|---|---|
| 2,560,443 A | * | 7/1951 | Hosford | 172/39 |
| 2,733,100 A | * | 1/1956 | Simonsen | 30/287 |
| 2,888,084 A | * | 5/1959 | Trecker | 172/41 |
| 3,062,299 A | * | 11/1962 | Koepfinger | 172/18 |
| 3,127,939 A | * | 4/1964 | Rink | 172/13 |
| 3,273,930 A | * | 9/1966 | Gottfried | 111/104 |
| 3,554,293 A | * | 1/1971 | Aman et al. | 172/13 |
| 3,814,189 A | * | 6/1974 | Thompson | 172/13 |
| 3,938,249 A | * | 2/1976 | Chacon | 30/300 |
| D242,894 S | * | 1/1977 | Harris | D8/8 |
| 4,133,389 A | * | 1/1979 | Ruhl et al. | 172/41 |
| 4,293,041 A | * | 10/1981 | Holmstadt et al. | 172/39 |
| 5,088,562 A | * | 2/1992 | Shields | 172/22 |
| 5,491,963 A | * | 2/1996 | Jerez | 56/17.1 |
| 5,938,290 A | * | 8/1999 | Mikeska | 30/300 |
| 6,134,789 A | * | 10/2000 | Strickland | 30/276 |
| 6,311,782 B1 | * | 11/2001 | Plasek et al. | 172/13 |

FOREIGN PATENT DOCUMENTS

DE        3631436 A1 *  4/1987  ........... A01B/39/22

* cited by examiner

Primary Examiner—Robert E. Pezzuto
Assistant Examiner—Alexandra K. Pechold
(74) Attorney, Agent, or Firm—Edward P. Dutkiewicz

(57) ABSTRACT

A grass and soil trimming system comprises a motor driven yard tool. The tool has a housing in a generally cylindrical configuration with a periphery and a female threaded interior and an interior locking screw. The female threaded interior of the mounting screw is adapted to screwably couple to a male thread of a drive shaft on the tool. A first pair of metal cutting blades is coupled to the periphery. The blades are adapted to cut and dig soil. The blades have a generally triangular configuration. A second pair of metal cutting blades is coupled to the periphery. The blades are adapted to cut grass. Each blade has a generally triangular configuration. The second cutting blades have a generally 90 degree bend.

2 Claims, 3 Drawing Sheets

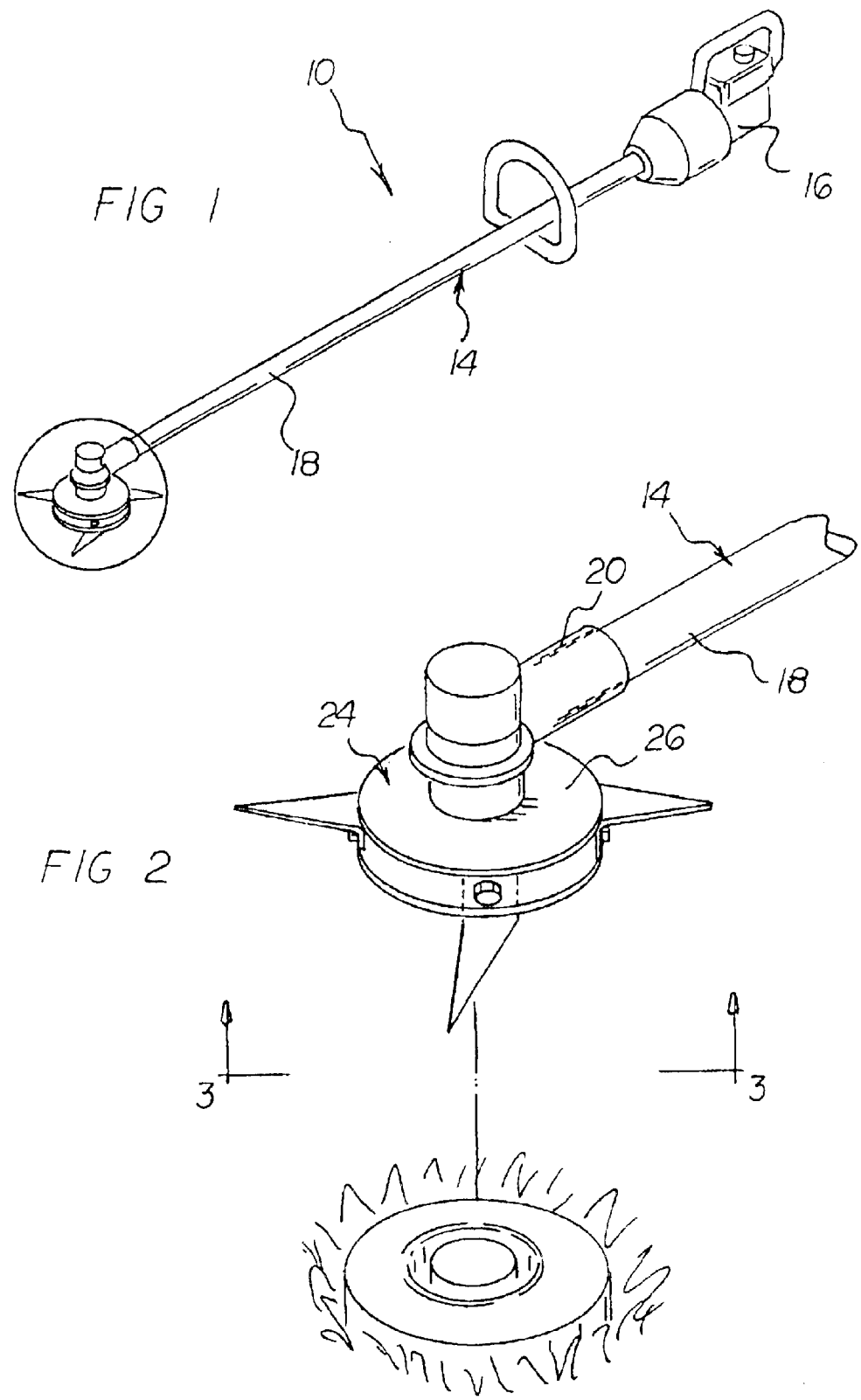

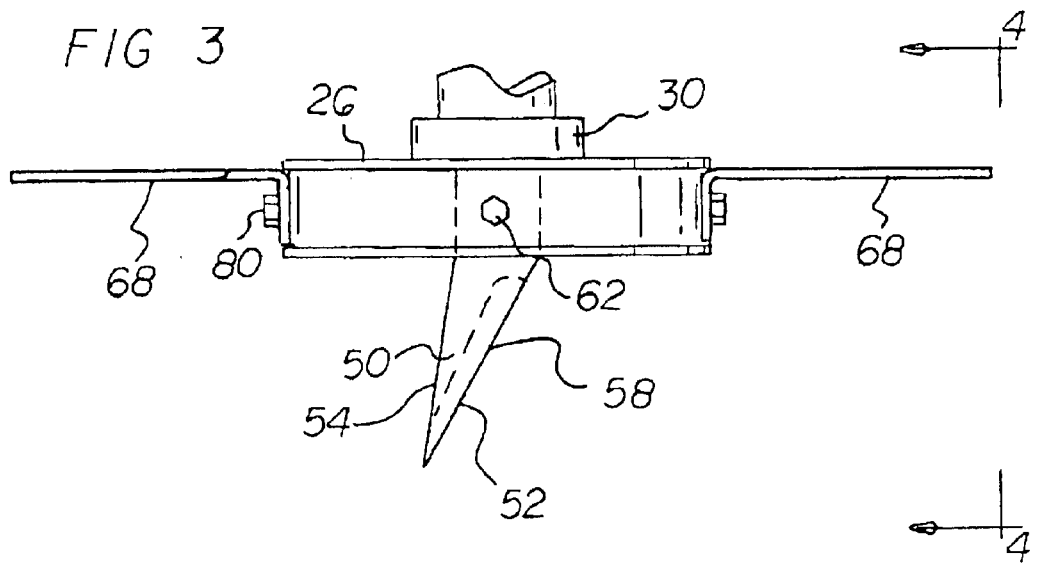
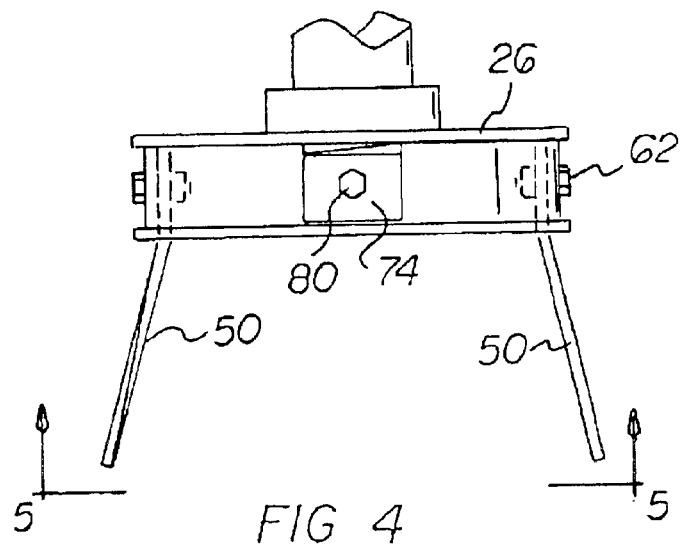

GRASS AND SOIL TRIMMING SYSTEM

BACKGROUND OF THE INVENTION

1. Field of the Invention

The present invention relates to a grass and soil trimming system and more particularly pertains to neatly cleaning an area around a sprinkler head.

2. Description of the Prior Art

The use of grass cutters of known designs and configurations is known in the prior art. More specifically, grass cutters of known designs and configurations previously devised and utilized for the purpose of cleaning sprinkler heads and adjacent areas through conventional methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 4,862,682 to Wait et al. discloses a cutting assembly for high-speed rotary grass trimming device. U.S. Pat. No. 3,554,293 to Aman et al. discloses a rotary weeding and edging attachment for rotary power source. Lastly, U.S. Pat. No. 4,501,332 to Straayer discloses a hand carried portable weeder convertible to a cultivator apparatus.

While these devices fulfill their respective, particular objectives and requirements, the aforementioned patents do not describe a grass and soil trimming system that allows neatly cleaning an area around a sprinkler head.

In this respect, the grass and soil trimming system according to the present invention substantially departs from the conventional concepts and designs of the prior art, and in doing so provides an apparatus primarily developed for the purpose of neatly cleaning an area around a sprinkler head.

Therefore, it can be appreciated that there exists a continuing need for a new and improved grass and soil trimming system which can be used for neatly cleaning an area around a sprinkler head. In this regard, the present invention substantially fulfills this need.

SUMMARY OF THE INVENTION

In view of the foregoing disadvantages inherent in the known types of grass cutters of known designs and configurations now present in the prior art, the present invention provides an improved grass and soil trimming system. As such, the general purpose of the present invention, which will be described subsequently in greater detail, is to provide a new and improved grass and soil trimming system and method which has all the advantages of the prior art and none of the disadvantages.

To attain this, the present invention essentially comprises a motor driven yard tool. The yard tool is from the class of motor driven yard tools. The class of motor driven yard tools includes, but is not limited to weeders and edgers. The yard tool has a motor and a power drive shaft. The drive shaft has a first end and a second end. The first end is coupled to the motor of the yard tool. The second end has male threads. A housing is provided. The housing has a generally cylindrical configuration is fabricated of a resilient plastic with a circular periphery, a top face and an interior region. The top face has a cylindrical flange. The flange extends into the interior region. The flange has a central bore with an inward edge and an outward edge. The circular periphery has four apertures equally spaced there around. Provided next is a metal mounting screw. The metal mounting screw is of a generally cylindrical configuration with an outward lip, a female threaded interior and an interior locking screw. The mounting screw is adapted to lie within the central bore of the flange on the house. The outward lip of the mounting screw lies adjacent to the outer edge of the flange. The interior locking screw holds the mounting screw to the housing with a washer. The washer lies between the mounting screw and interior edge of the flange. The female threaded interior of the mounting screw is adapted to screwably couple to the male threading of the drive shaft on the yard tool there by transferring the rotational energy from the motor to the housing. Further provided is a first pair of metal cutting blades. The blades are adapted to cut and dig soil. The blades have a generally isosceles triangular configuration. Each blade has a first long edge, a second long edge and a short edge. The first long edge has a cutting surface. The second long edge is dull. The first cutting blades also have a first circular aperture there through adjacent to the short edge. The first circular apertures of the first pair of metal cutting blades is adapted to be coupled within the interior region of the housing adjacent to two of the four apertures of the housing. In this manner the first blades are on opposite sides of each other and held in place with a first pair of nuts and bolts. Provided last is a second pair of metal cutting blades. The metal cutting blades are adapted to cut grass. Each has a generally isosceles triangular configuration. Each has a first sharp edge, a second dull edge and a base with a second circular aperture adjacent thereto. The second cutting blades have a generally 90 degree bend between the edges and the base. The base of the second blades are adapted to lie adjacent to the periphery of the housing with the cutting blades lying linear. The top face of the housing and second circular apertures of the second blades are aligned with the remaining apertures of the housing. In this manner they lie on opposite sides of each other and are coupled with a second pair of nuts and bolts. The cutting surfaces of the first blades and the sharp edges of the second blades are configured such that when the housing is rotating all the blades will have a cutting action.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved grass and soil trimming system which has all of the advantages of the prior art grass cutters of known designs and configurations and none of the disadvantages.

It is another object of the present invention to provide a new and improved grass and soil trimming system which may be easily and efficiently manufactured and marketed.

It is further an object of the present invention to provide a new and improved grass and soil trimming system which is of durable and reliable constructions.

An even further object of the present invention is to provide-a new and improved grass and soil trimming system which is susceptible of a low cost of manufacture with regard to both materials and labor, and which accordingly is then susceptible of low prices of sale to the consuming public, thereby making such grass and soil trimming system economically available to the buying public.

Even still another object of the present invention is to provide a grass and soil trimming system for neatly cleaning an area around a sprinkler head.

Lastly, it is an object of the present invention to provide a new and improved grass and soil trimming. The tool has a housing in a generally cylindrical configuration with a periphery and a female threaded interior and an interior locking screw. The female threaded interior of the mounting screw is adapted to screwably couple to a male thread of a drive shaft on the tool. A first pair of metal cutting blades is coupled to the periphery. The blades are adapted to cut and dig soil. The blades have a generally triangular configuration. A second pair of metal cutting blades is coupled to the periphery. The blades are adapted to cut grass. Each blade has a generally triangular configuration. The second cutting blades have a generally 90 degree bend.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective illustration of a grass and soil trimming system constructed in accordance with the principles of the present invention.

FIG. 2 is an enlarged end view of the operating components of the system of FIG. 1 showing its relationship to a sprinkler head and associated grass and soil.

FIG. 3 is a side elevational view of the tool shown in FIGS. 1 and 2.

FIG. 4 is an end elevational view taken along line 4—4 of FIG. 3.

The same reference numerals refer to the same parts throughout the various Figures.

DESCRIPTION OF THE PREFERRED EMBODIMENT

Figure 5:
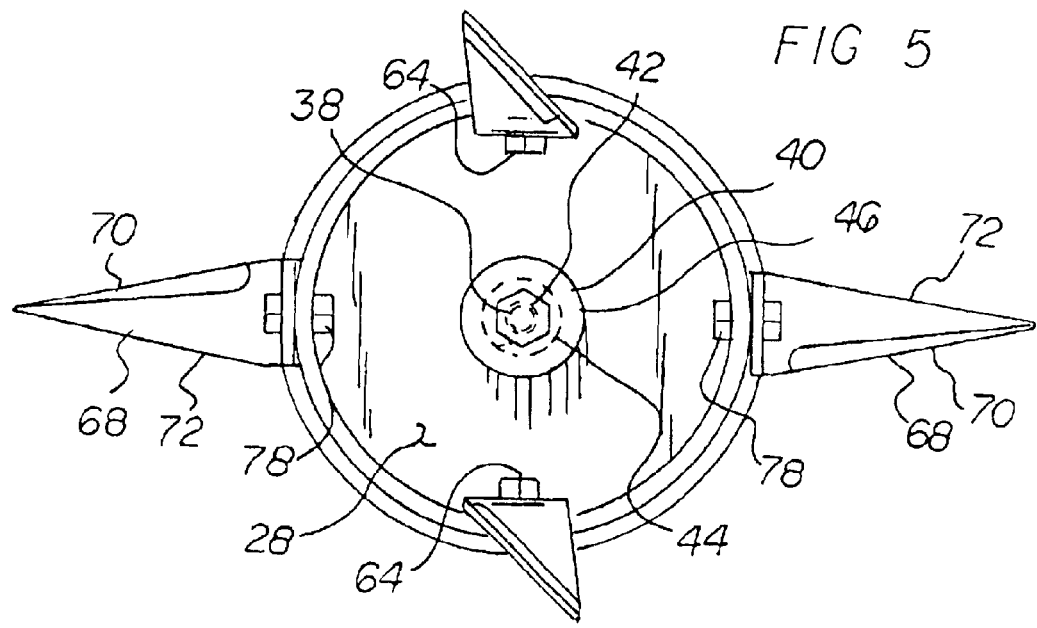
FIG. 5 is a bottom view of the head taken along line 5—5 of FIG. 4.
Figure 6:
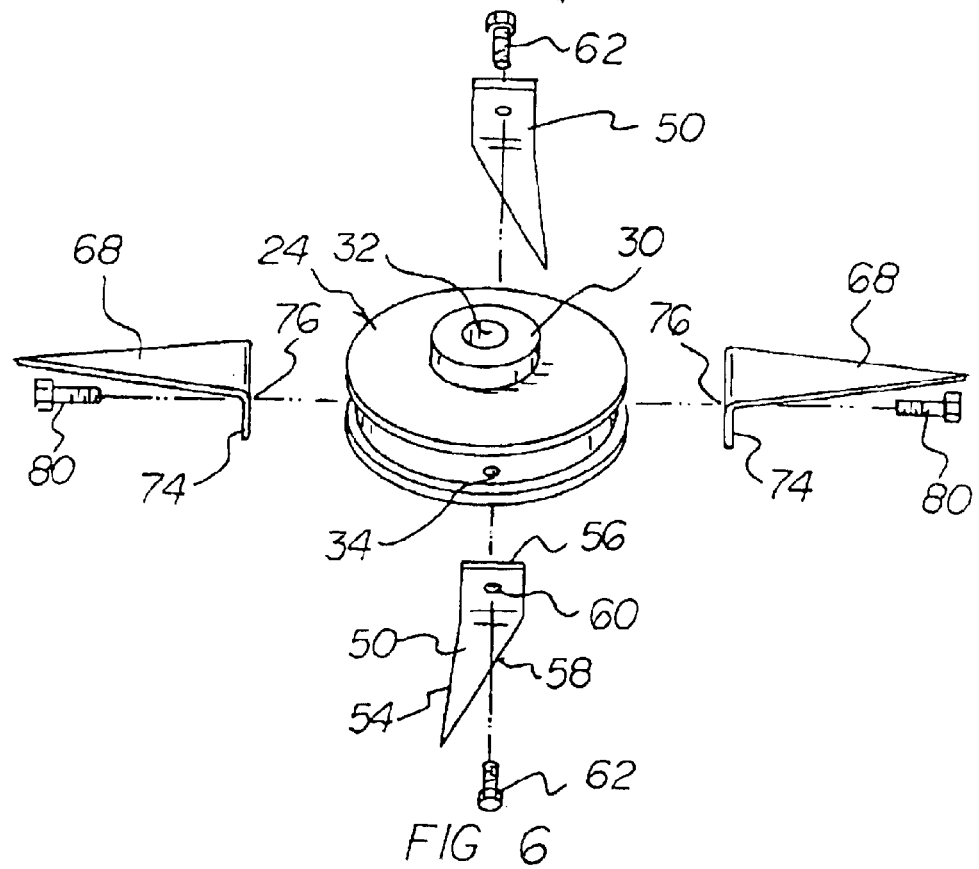
FIG. 6 is an exploded perspective view of the tool shown in the prior Figures.

With reference now to the drawings, and in particular to FIG. 1 thereof, the preferred embodiment of the new and improved grass and soil trimming system embodying the principles and concepts of the present invention and generally designated by the reference numeral 10 will be described.

The present invention, the grass and soil trimming system 10 is comprised of a plurality of components. Such components in their broadest context include a motor driven yard tool, a first pair of metal cutting blades, and a second pair of metal cutting blades. Such components are individually configured and correlated with respect to each other so as to attain the desired objective.

First provided is a motor driven yard tool 14. The yard tool is from the class of motor driven yard tools. The class of motor driven yard tools includes, but is not limited to weeders and edgers. The yard tool has a motor 16 and a power drive shaft 18. The drive shaft has a first end and a second end 20. The first end is coupled to the motor of the yard tool. The second end has male threads.

A housing 24 is provided. The housing has a generally cylindrical configuration is fabricated of a resilient plastic with a circular periphery, a top face 26 and an interior region 28. The top face has a cylindrical flange 30. The flange extends into the interior region. The flange has a central bore 32 with an inward edge and an outward edge. The circular periphery has four apertures 34 equally spaced there around.

Provided next is a metal mounting screw 38. The metal mounting screw is of a generally cylindrical configuration with an outward lip 40, a female threaded interior 42 and an interior locking screw 44. The mounting screw is adapted to lie within the central bore of the flange on the house. The outward lip of the mounting screw lies adjacent to the outer edge of the flange. The interior locking screw holds the mounting screw to the housing with a washer 46. The washer lies between the mounting screw and interior edge of the flange. The female threaded interior of the mounting screw is adapted to screwably couple to the male threading of the drive shaft on the yard tool there by transferring the rotational energy from the motor to the housing.

Further provided is a first pair of metal cutting blades 50 is provided. The blades are adapted to cut and dig soil. The blades have a generally isosceles triangular configuration. Each blade has a first long edge 52, a second long edge 54 and a short edge 56. The first long edge has a cutting surface 58. The second long edge is dull. The first cutting blades also have a first circular aperture 60 there through adjacent to the short edge. The first circular apertures of the first pair of metal cutting blades is adapted to be coupled within the interior region of the housing adjacent to two of the four apertures of the housing. In this manner the first blades are on opposite sides of each other and held in place with a first pair of nuts 62 and bolts 64.

Provided last is a second pair of metal cutting blades 68. The metal cutting blades are adapted to cut grass. Each has a generally isosceles triangular configuration. Each has a first sharp edge 70, a second dull edge 72 and a base 74 with a second circular aperture 76 adjacent thereto. The second cutting blades have a generally 90 degree bend between the edges and the base. The base of the second blades are adapted to lie adjacent to the periphery of the housing with the cutting blades lying linear. The top face of the housing and second circular apertures of the second blades are aligned with the remaining apertures of the housing. In this manner they lie on opposite sides of each other and are coupled with a second pair of nuts 78 and bolts 80. The cutting surfaces of the first blades and the sharp edges of the second blades are configured such that when the housing is rotating all the blades will have a cutting action.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A grass and soil trimming system for neatly cleaning an area around a sprinkler head comprising, in combination:

a motor driven yard tool from the class of motor driven yard tools including but not limited to weeders and edgers, the yard tool having a motor and a power drive shaft, the drive shaft having a first end coupled to the motor of the yard tool and a second end having male threads;

a housing having a generally cylindrical configuration being fabricated of a resilient plastic with a circular periphery, a top face and an interior region, the top face having a cylindrical flange extending into the interior region, the flange having a central bore with an inward edge and an outward edge, the circular periphery having four apertures equally spaced there around;

a metal mounting screw of a generally cylindrical configuration with an outward lip and a female threaded interior and an interior locking screw, the mounting screw being adapted to lie within the central bore of the flange on the house with the outward lip of the mounting screw lying adjacent to the outer edge of the flange, the interior locking screw holding the mounting screw to the housing with a washer lying between the mounting screw and interior edge of the flange, the female threaded interior of the mounting screw being adapted to screwably couple to the male threading of the drive shaft on the yard tool there by transferring the rotational energy from the motor to the housing;

a first pair of metal cutting blades being adapted to cut and dig soil and having a generally isosceles triangular configuration each with a first long edge, a second long edge and a short edge, the first long edge having a cutting surface and the second long edge being dull, the first cutting blades also having a first circular aperture there through adjacent to the short edge, the first circular apertures of the first pair of metal cutting blades being adapted to be coupled within the interior region of the housing adjacent to two of the four apertures of the housing such that the first blades are on opposite side of each other and held in place with a first pair of nuts and bolts; and a second pair of metal cutting blades being adapted to cut grass and each having a generally isosceles triangular configuration with a first sharp edge and a second dull edge and a base with a second circular aperture adjacent thereto, the second cutting blades having a generally 90 degree bend between the edges and the base, the base of the second blades being adapted to lie adjacent to the periphery of the housing with the cutting blades lying linear with the top face of the housing and second circular apertures of the second blades being aligned with the remain apertures of the housing such that they too lie on opposite sides of each other and being coupled with a second pair of nuts and bolts, the cutting surfaces of the first blades and the sharp edges of the second blades being configured such that when the housing is rotating all the blades will have a cutting action.

2. A grass and soil trimming system comprising:

a motor driven yard tool having a housing in a generally cylindrical configuration with a periphery and a female threaded interior and an interior locking screw, the female threaded interior of the mounting screw being adapted to screwably couple to a male thread of a drive shaft on the yard tool;

a first pair of metal cutting blades coupled to the periphery being adapted to cut and dig soil and having a generally triangular configuration, the first pair of metal cutting blades being rotatable about a primary axis of rotation in a primary plane perpendicular to the primary axis of rotation; and a second pair of metal cutting blades coupled to the periphery being adapted to cut grass and each having a generally triangular configuration, the second cutting blades having a generally 90 degree bend, the second pair of metal cutting blades being rotatable about the primary axis of rotation with the blades oriented perpendicular to the primary plane, the second pair of metal cutting blades being concurrently rotatable with the first pair of metal cutting blades.

* * * * *